(12) United States Patent
Davis (10) Patent No.: US 12,043,385 B2
(45) Date of Patent: Jul. 23, 2024

(54) AIRCRAFT CONTROL SURFACE HAVING VARIABLE HEIGHT CORRUGATED CORE

(71) Applicant: ROHR, INC., Chula Vista, CA (US)

(72) Inventor: Jennifer Davis, La Jolla, CA (US)

(73) Assignee: ROHR, INC., Chula Vista, CA (US)

( * ) Notice: Subject to any disclaimer, the term of this patent is extended or adjusted under 35 U.S.C. 154(b) by 277 days.

(21) Appl. No.: 17/473,878

(22) Filed: Sep. 13, 2021

(65) Prior Publication Data

US 2023/0078268 A1 Mar. 16, 2023

(51) Int. Cl.
*B64C 9/02* (2006.01)
*B29C 53/24* (2006.01)
*B29C 70/42* (2006.01)
*B29K 701/12* (2006.01)
*B29L 31/30* (2006.01)

(52) U.S. Cl.
CPC ................ *B64C 9/02* (2013.01); *B29C 53/24* (2013.01); *B29C 70/42* (2013.01); *B29K 2701/12* (2013.01); *B29L 2031/3076* (2013.01)

(58) Field of Classification Search
CPC ...... B64C 9/02; B64C 2009/005; B29C 53/24
See application file for complete search history.

(56) References Cited

U.S. PATENT DOCUMENTS

| | | | | |
|---|---|---|---|---|
| 1,751,957 A | * | 3/1930 | Towle | B64C 3/00 244/123.12 |
| 2,867,391 A | * | 1/1959 | Jacobsen | B64C 9/38 244/209 |
| 3,970,270 A | * | 7/1976 | Pittet, Jr. | B64C 3/30 244/30 |
| 5,330,092 A | * | 7/1994 | Gregg | B64C 27/473 72/709 |
| 5,848,765 A | * | 12/1998 | Gillespie | B64C 9/18 244/131 |
| 6,726,974 B1 | | 4/2004 | Pflug et al. | |
| 7,802,759 B2 | * | 9/2010 | Ishikawa | B64C 3/48 244/123.12 |
| 8,784,592 B2 | | 7/2014 | Kolax et al. | |
| 10,443,496 B2 | | 10/2019 | Herrera et al. | |
| 2010/0224734 A1 | * | 9/2010 | Grip | B64C 9/16 244/219 |
| 2017/0174313 A1 | * | 6/2017 | Brakes | B64C 9/16 |
| 2018/0043639 A1 | * | 2/2018 | Autry | B64C 1/14 |
| 2018/0086429 A1 | * | 3/2018 | Sheppard | B64C 9/00 |
| 2019/0256189 A1 | * | 8/2019 | Fenske | B64C 3/52 |
| 2020/0353667 A1 | | 11/2020 | Davis | |
| 2021/0362833 A1 | * | 11/2021 | Gruner | B64C 3/26 |

FOREIGN PATENT DOCUMENTS

| | | | | |
|---|---|---|---|---|
| EP | 2842867 A1 | * | 3/2015 | ............. B64C 3/185 |
| EP | 3301014 | | 4/2018 | |

OTHER PUBLICATIONS

European Patent Office, European Search Report dated Feb. 1, 2023 in Application No. 22195295.5.

* cited by examiner

*Primary Examiner* — Michael H Wang (74) *Attorney, Agent, or Firm* — SNELL & WILMER L.L.P.

(57) ABSTRACT

A control surface for an aircraft may comprise an outer skin and a core coupled to the outer skin. The core may include a plurality of corrugations. A height of the core may decrease in a direction extending from a leading edge of the control surface to a trailing edge of the control surface.

18 Claims, 11 Drawing Sheets

AIRCRAFT CONTROL SURFACE HAVING VARIABLE HEIGHT CORRUGATED CORE

FIELD

The present disclosure relates generally to control surfaces and, more particularly, to aircraft control surfaces having corrugated stiffening cores of variable height and methods of forming the same.

BACKGROUND

An aircraft may include several control surfaces configured to affect the yaw, roll, and pitch of the aircraft during flight. Such control surfaces may include, for example, ailerons to affect the roll about a longitudinal axis, a rudder to affect the yaw about a vertical axis and an elevator to affect the pitch about a lateral axis, each axis being with respect to a coordinate system fixed to the aircraft. Additional control surfaces include trailing edge flaps configured to affect the lift of a wing, leading edge slats configured to affect the stall speed of a wing, and spoilers, which are generally located adjacent to and forward of the trailing edge flaps and are configured to disrupt the airflow over a wing surface to reduce lift or to increase drag. Current spoilers are airfoil-like components that include a metal honeycomb core sandwiched between two metal skins with sidewalls (also referred to as "closeouts") fastened about the honeycomb core to the close the area between the skins. The honeycomb core and closeouts are typically machined to match the airfoil shape of the spoiler. Machining these parts tends to increase manufacturing times and material waste.

SUMMARY

A control surface for an aircraft is disclosed herein. In accordance with various embodiments, the control surface comprises an outer skin and a core coupled to the outer skin. The core includes a plurality of folded corrugations. A height of the core decreases in a direction extending from a leading edge of the control surface to a trailing edge of the control surface.

In various embodiments, the plurality of folded corrugations comprises a plurality of ridges and a plurality of grooves. The plurality of ridges is located at the outer skin.

In various embodiments, a pitch of the ridges proximate the trailing edge is less than a pitch of the ridges proximate the leading edge.

In various embodiments, the core further includes a core mounting flange located at the leading edge. In various embodiments, the outer skin comprises an outer skin mounting flange. The outer skin mounting flange is coupled to the core mounting flange.

In various embodiments, an inner skin is coupled to the plurality of grooves. In various embodiments, the core includes a plurality of closeout flanges extending between the plurality of ridges and the plurality of grooves and between the inner skin and the outer skin.

In various embodiments, the outer skin and the core each comprises a fiber reinforced thermoplastic composite material.

A method of forming a control surface is also disclosed herein. In accordance with various embodiments, the method comprises the steps of forming an outer skin, forming a thermoplastic panel into a corrugated core having a plurality of ridges and a plurality of grooves, and coupling the corrugated core to the outer skin. The plurality of ridges decreases in height between a leading edge ridge of the plurality of ridges and a trailing edge ridge of the plurality of ridges.

In various embodiments, the thermoplastic panel and the outer skin each comprises a fiber reinforced thermoplastic composite material.

In various embodiments, the step of coupling the corrugated core to the outer skin comprises heating at least one of the outer skin or the corrugated core such that a matrix material of the fiber reinforced thermoplastic composite material of the corrugated core crosslinks with a matrix material of the fiber reinforced thermoplastic composite material of the outer skin.

In various embodiments, the method further comprises the steps of forming an inner skin comprising the fiber reinforced thermoplastic composite material, locating the corrugated core between the inner skin and the outer skin, and coupling the corrugated core to the inner skin by heating at least one of the inner skin or the corrugated core such that the matrix material of the fiber reinforced thermoplastic composite material of the corrugated core crosslinks with a matrix material of the fiber reinforced thermoplastic composite material of the inner skin.

In various embodiments, the step of forming the thermoplastic panel into the corrugated core comprises forming a mounting flange at a leading edge of the corrugated core.

In various embodiments, the step of forming the thermoplastic panel into the corrugated core comprises forming a plurality of first closeout flanges over an outboard end of the control surface; and forming a plurality of second closeout flanges over an inboard end of the control surface.

In various embodiments, the method further comprises the step of coupling the outer skin and the corrugated core to an aerostructure such that the corrugated core is adjacent to the aerostructure.

In various embodiments, the step of forming the thermoplastic panel into the corrugated core comprises forming the plurality of ridges having a decreased pitch proximate a trailing edge.

An aerostructure is also disclosed herein. In accordance with various embodiments, the aerostructure comprises an aerostructure surface and a control surface mounted to the aerostructure surface. The control surface includes an outer skin and a core coupled to the outer skin. The core is located between the aerostructure surface and the outer skin. The core includes a plurality of corrugations. A height of the core decreases in a direction extending from a leading edge of the control surface to a trailing edge of the control surface.

In various embodiments, the plurality of corrugations includes a plurality of ridges and a plurality of grooves, and the outer skin terminates at a leading edge ridge of the plurality of ridges.

In various embodiments, the core includes a core mounting flange and the outer skin includes an outer skin mounting flange. The outer skin mounting flange is coupled to the core mounting flange, and the aerostructure further comprises a mount coupled to the outer skin mounting flange and the core mounting flange.

In various embodiments, the core is adjacent to the aerostructure surface.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
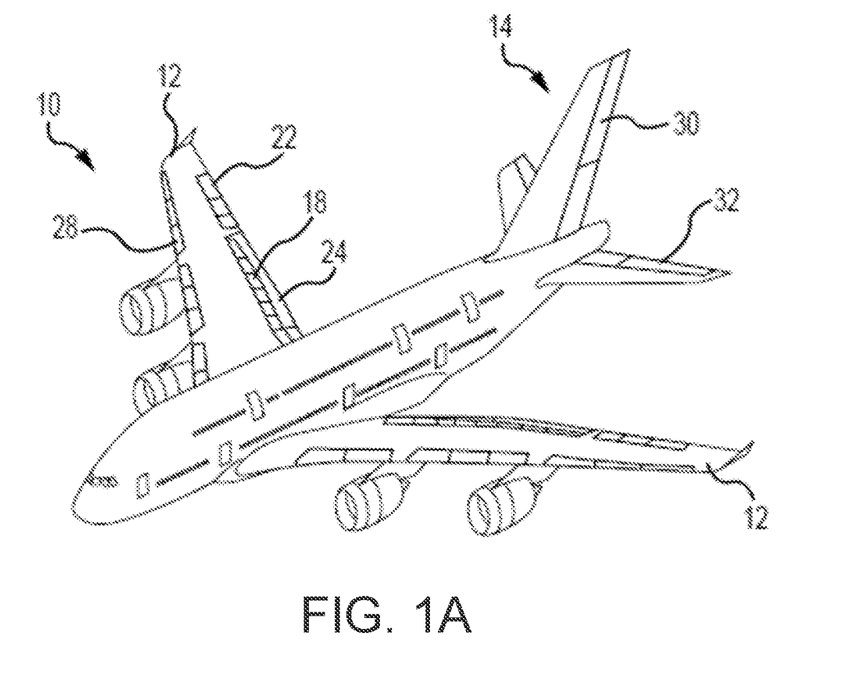
FIG. 1A is a perspective view of an aircraft having a variety of control surfaces distributed about the wings and tail structure, in accordance with various embodiments.
Figure 1B:
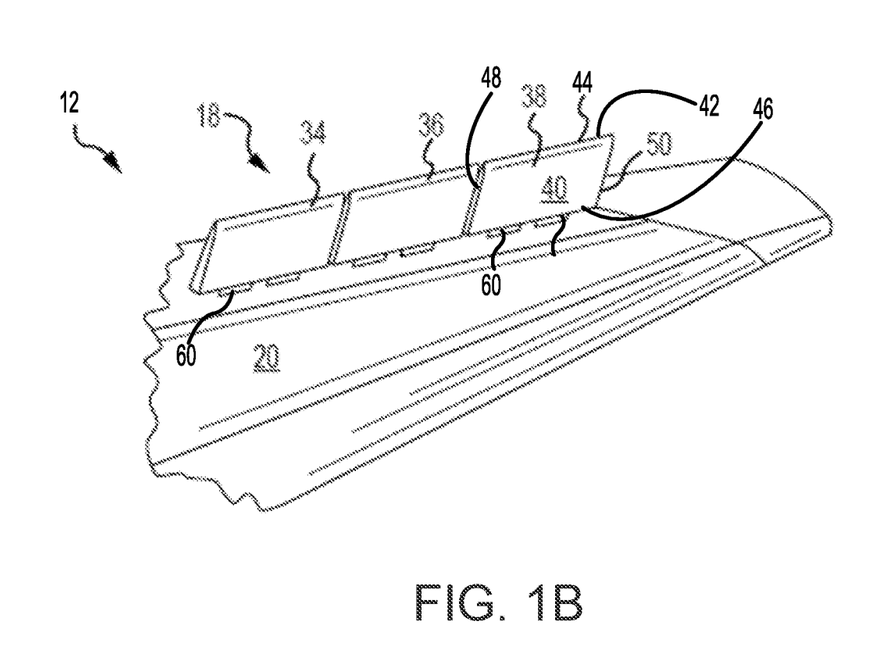
FIG. 1B is a perspective view of an aircraft wing having spoilers illustrated in a deployed position, in accordance with various embodiments.

Referring now to the drawings, FIG. 1A illustrates an aircraft 10 having a variety of control surfaces disposed on/about the wings 12 and the tail section 14 of the aircraft 10. FIG. 1B illustrates a wing 12 having a plurality of spoilers 18 disposed along an upper surface 20 of the wing 12, with each of the plurality of spoilers 18 illustrated in a deployed position. Referring specifically to FIG. 1A, the variety of control surfaces typically used on the wings 12 of the aircraft 10 may include, for example, a spoiler 18, an aileron 22, a trailing edge flap 24, and a leading edge slat 28. Spoiler 18 is disposed adjacent to and forward of the trailing edge flap 24. The variety of control surfaces typically used on the tail section 14 of the aircraft 10 may include, for example, a rudder 30 and an elevator 32.

While the foregoing description of the variety of control surfaces generally refers to each control surface as a single component, it will be appreciated that, in various embodiments, each individual component (e.g., spoiler 18) may be a single component within a plurality of like components (e.g., a plurality of spoilers 18), as illustrated in FIG. 1B. For example, with reference to FIG. 1B, the plurality of spoilers 18 may, in various embodiments, include a first spoiler 34, a second spoiler 36, and a third spoiler 38. In various embodiments, each one of the plurality of spoilers 18 includes an upper surface 40 and a lower surface 42 opposite the upper surface 40, a trailing edge 44, a leading edge 46, an inboard (or first) end 48, and an outboard (or second) end 50. One or more spoiler mounts (e.g., fasteners) 60 may be used to secure spoilers 18 to the aerostructure (e.g., the wing 12). In various embodiments, spoiler mounts 60 may be located along the leading edge 46 of spoilers 18 and may secure spoilers 18 to wing 12. While details and examples are included herein pertaining to spoilers, such as, for example, one of the plurality of spoilers 18 just described, the present disclosure is not necessarily so limited, and thus aspects of the disclosed embodiments may be adapted for performance in a variety of other control surfaces, such as, for example, aileron 22, trailing edge flap 24, rudder 30, and/or elevator 32 as described above.

Figure 2A:
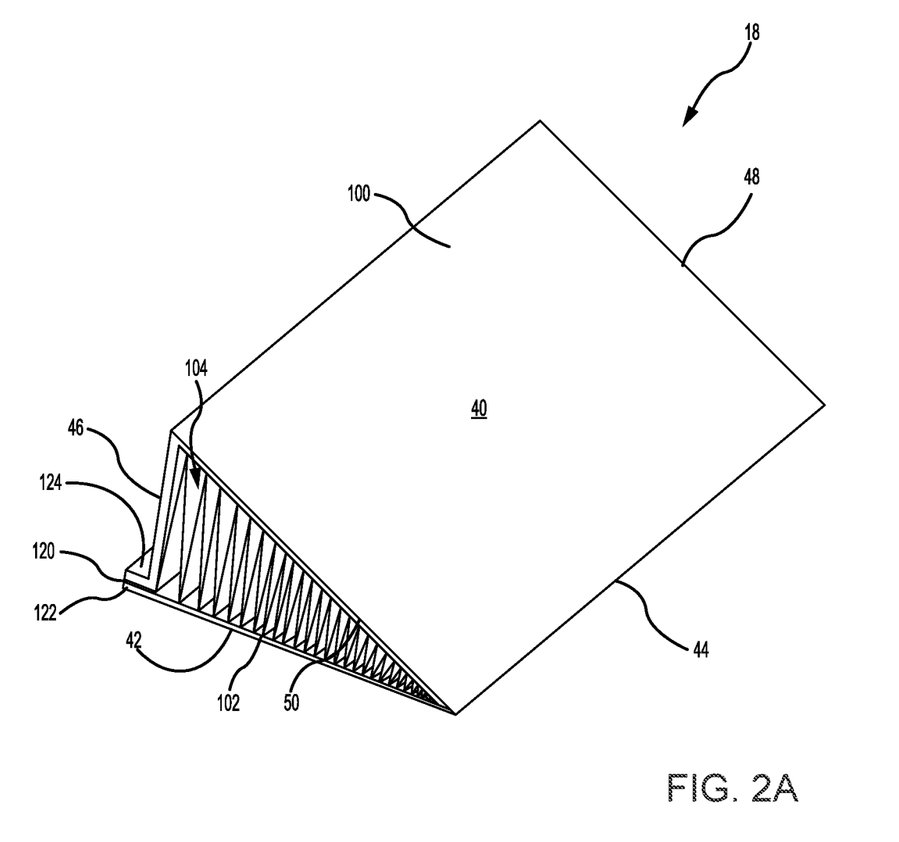
FIGS. 2A and 2B illustrate a spoiler having a corrugated core, in accordance with various embodiments.
Figure 2B:
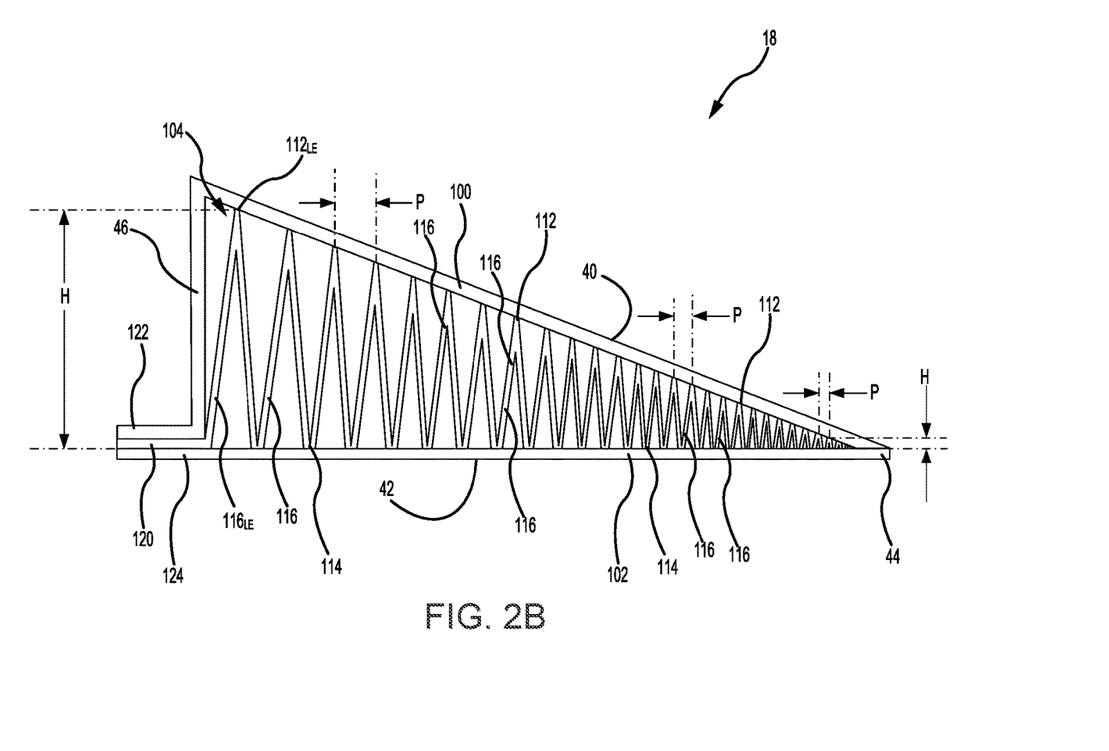

Referring now to FIGS. 2A and 2B, various aspects of a spoiler 18, described above with reference to FIG. 1B, are illustrated. In accordance with various embodiments, spoiler 18 includes an outer (or first) skin 100, an inner (or second) skin 102, and a core 104. Outer skin 100 may form upper surface 40 of spoiler 18. Inner skin 102 may form lower surface 42. In this regard, when in the deployed position (as shown FIG. 1B), outer skin 100 and upper surface 40 are oriented generally in the forward direction, while inner skin 102 and lower surface 42 are oriented generally aft. In the stowed position, inner skin 102 and lower surface 42 are oriented toward wing 12 (FIG. 1B), while outer skin 100 and upper surface 40 are oriented (e.g., face) away from wing 12. Outer skin 100 may form leading edge 46

Outer skin 100 and inner skin 102 may be formed of continuous fiber reinforced thermoplastic composite materials, such as, for example, polyaryletherketone (PAEK) combinations that exhibit high-temperature stability and high mechanical strength. Such materials also include polyether ether ketone (PEEK) and polyetherketoneketone (PEKK). In this regard, outer skin 100 and inner skin 102 are formed of a material that includes fibers (e.g., carbon and/or glass fibers) surrounded by a thermoplastic (e.g., PAEK, PEEK PEKK) matrix.

In accordance with various embodiments, core 104 is located between outer skin 100 and inner skin 102. Core 104 may extend between and contact outer skin 100 and inner skin 102. As described in further detail below, core 104 may be coupled to outer skin 100 and inner skin 102. Core 104 may extend from inboard end 48 to outboard end 50 of spoiler 18. Core 104 may be formed of continuous fiber reinforced thermoplastic composite material, such as, for example, PAEK, PEEK, PEKK. In this regard, core 104 is formed of a material that includes fibers (e.g., carbon and/or glass fibers) surrounded by a thermoplastic (e.g., PAEK, PEEK PEKK) matrix.

Figure 3:
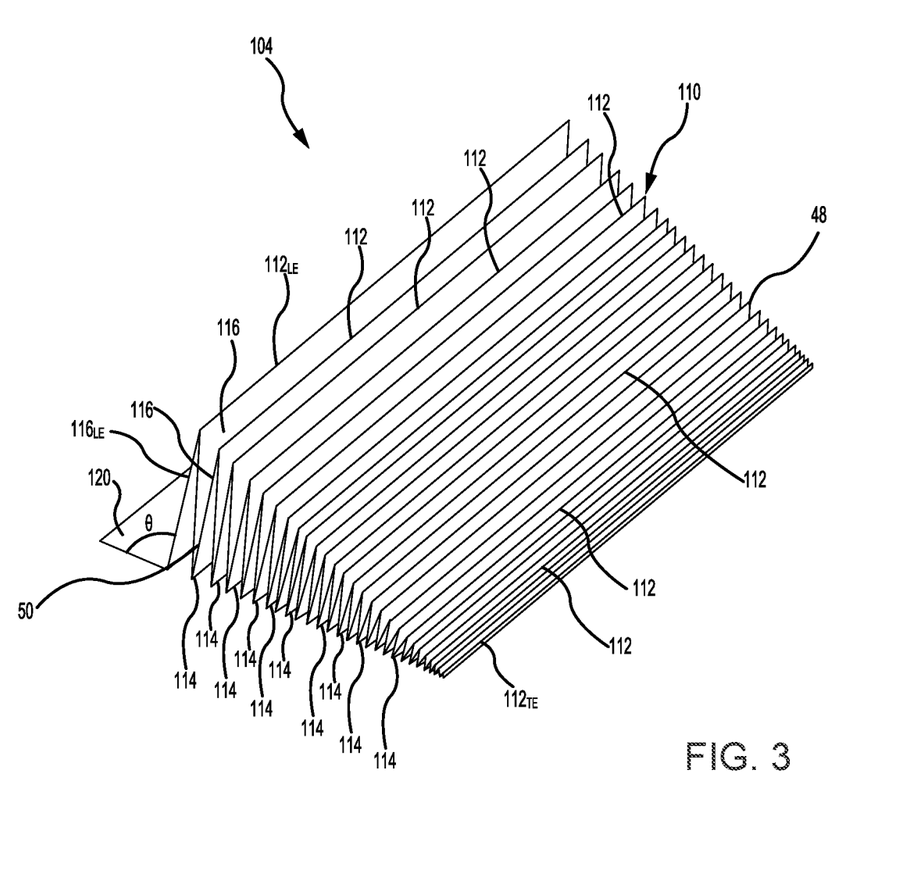
FIG. 3 illustrates a corrugated core for a control surface, in accordance with various embodiments.

FIG. 3 illustrates core 104. With combined reference to FIG. 3 and FIGS. 2A and 2B, in accordance with various embodiments, core 104 comprises a plurality of corrugations 110 (e.g., core 104 is a corrugated core). For example, core 104 may be heated until the fiber reinforced thermoplastic composite material becomes pliable. Once pliable, the material is corrugated or otherwise shaped (e.g., folded, shaped over a mold tool, etc.) to the desired core shape. In accordance with various embodiments, core 104 may be a continuous piece of material that is corrugated. Core 104 has a height H. Height H of core 104 decreases in a direction extending from leading edge 46 to trailing edge 44. For example, corrugations 110 (also referred to as folded corrugations) may include a plurality of ridges (or outer apexes) 112 located at outer skin 100 and a plurality of grooves (or inner apexes) 114 located at inner skin 102. Walls 116 of core 104 extend between ridges 112 and grooves 114. In various embodiments, ridges 112, grooves 114, and walls 116 may extend from inboard end 48 to outboard end 50. While FIG. 3 illustrates ridges 112, grooves 114, and walls 116 as having a generally straight shape (e.g., ridges 112, grooves 114, and walls 116 form generally straight, planar, and/or flat structures between inboard end 48 and outboard end 50), it is contemplated that ridges 112 and/or grooves 114 and/or walls 116 may be formed in other shapes.

Figure 4:
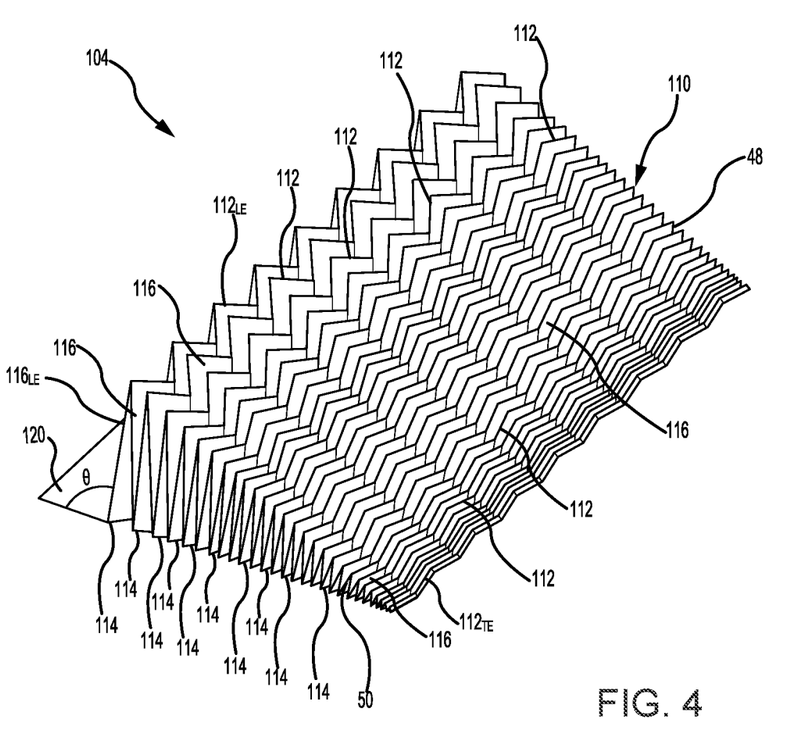
FIG. 4 illustrates a corrugated core formed in a zig-zag pattern for a control surface, in accordance with various embodiments.

For example, and with reference to FIG. 4, in various embodiments, corrugations 110 may be formed in a zig-zag pattern between inboard end 48 and outboard end 50. In this regard, ridges 112, grooves 114, and the walls 116 extending between each ridge 112 and groove 114 may include a plurality of angled portions (e.g., portions that are oriented at angles other than 180° relative to on another). The straight configuration of corrugations 110 of core 104 in FIG. 3 and the zig-zag configuration of corrugations 110 of core 104 in FIG. 4 are exemplary. It is contemplated and understood that ridges 112 and/or grooves 114 and/or walls 116 of core 104 may be formed having any desired shape—e.g., curved, polygonal, multi-angle, etc. shaped portions—extending between inboard end 48 and outboard end 50.

With combined reference to FIG. 3 and FIGS. 2A and 2B, in accordance with various embodiments, the height H of walls 116 (i.e., the distance between each ridge 112 and its adjacent groove 114) deceases in a direction extending from leading edge 46 to trailing edge 44. In this regard, a height H of a leading edge ridge $112_{LE}$ may be greater than the height H of ridges 112 located closer to trailing edge 44. In various embodiments, a pitch P of ridges 112 may decrease closer to trailing edge 44 (e.g., the pitch P may progressively decrease proceeding in the direction of the trailing edge 44). The pitch P of ridges 112 is the distance between adjacent ridges 112. In this regard, the pitch of the ridges 112 proximate trailing edge may be less than the pitch P of the ridges 112 proximate leading edge 46. The decreased pitch of ridges 112 proximate trailing edge 44 tends to increase the strength of spoiler 18 at trailing edge 44 due to the increased density of the core 104 near trailing edge 44.

In various embodiments, core 104 includes a core mounting flange 120. Core mounting flange 120 may extend from a leading edge wall $116_{LE}$ of core 104. Core mounting flange 120 may be oriented at an angle θ of between 45° and 135°, between 60° and 120°, and/or between 80° and 100° relative to leading edge wall $116_{LE}$ of core 104. In various embodiments, angle θ may be approximately 90°. In the previous context only, "approximately" means±5°. Core mounting flange 120 may be located between an outer skin mounting flange 122 of outer skin 100 and an inner skin mounting flange 124 of inner skin 102. Core mounting flange 120 may be coupled to outer skin mounting flange 122 and inner skin mounting flange 124.

Core mounting flange 120, outer skin mounting flange 122, and inner skin mounting flange 124 (collectively "mounting flanges 120, 122, 124") may be located at leading edge 46 of spoiler 18. In various embodiments, mounting flanges 120, 122, 124 may be employed to secure the spoiler 18 to an aerostructure (e.g., wing 12). Stated differently, spoiler 18 may be attached to the aerostructure (e.g., wing 12) by coupling spoiler mounts 60 to mounting flanges 120, 122, 124. Coupling core mounting flange 120 to outer skin 100 and inner skin 102 tends to increase the bond strength between core 104 and outer and inner skins 100, 102, by increasing the contact area between core 104 and outer and inner skins 100, 102. Core mounting flange 120 may be coupled to outer skin mounting flange 122 and inner skin mounting flange 124 by heating outer skin 100 and/or of inner skin 102 and/or core 104 such that the thermoplastic matrix of outer skin 100 and inner skin crosslinks (e.g., polymerizes) with the thermoplastic matrix of core 104.

Figure 5:
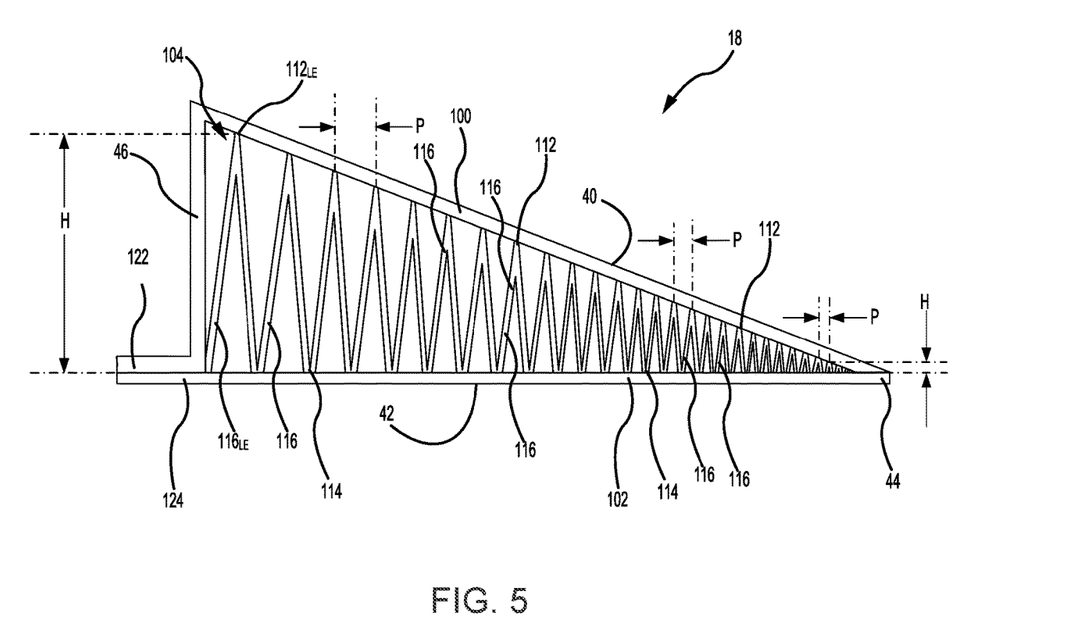
FIG. 5 illustrates a spoiler having a corrugated core, in accordance with various embodiments.

With reference to FIG. 5, in various embodiments, outer skin mounting flange 122 may be coupled directly to inner skin mounting flange 124. In other words, in various embodiments, core 104 may not include core mounting flange 120. Outer skin mounting flange 122 may be coupled to inner skin mounting flange 124 by heating outer skin 100 and/or of inner skin 102 such that the thermoplastic matrix of outer skin 100 crosslinks (e.g., polymerizes) with the thermoplastic matrix of inner skin 102.

Figure 6:
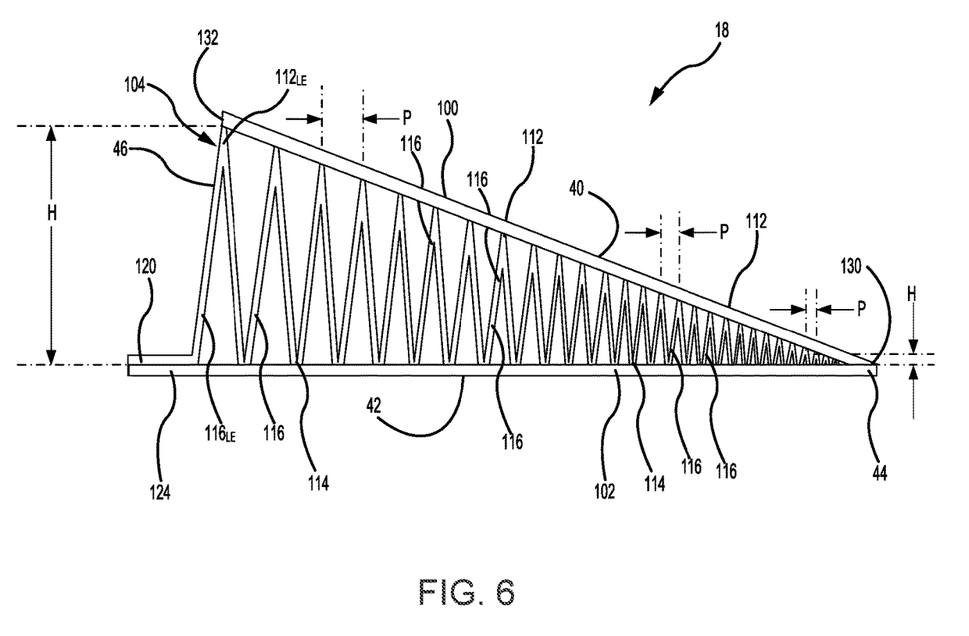
FIG. 6 illustrates a spoiler having a corrugated core with the corrugated core forming a leading edge of the spoiler, in accordance with various embodiments.

With reference to FIG. 6, in various embodiments, core 104 may form leading edge 46 of spoiler 18. In this regard, outer skin 100 may terminate at the leading edge ridge $112_{LE}$ of core 104. Leading edge ridge $112_{LE}$ is the ridge 112 that is closest to the leading edge 46 of spoiler 18. Stated differently, outer skin 100 may include a first end 130, which is coupled to core 104 and inner skin 102 at trailing edge 44, and a second end 132, which is opposite first end 130 and which is coupled to leading edge ridge $112_{LE}$. Core mounting flange 120 of core 104 may be coupled to inner skin mounting flange 124.

Figure 7:
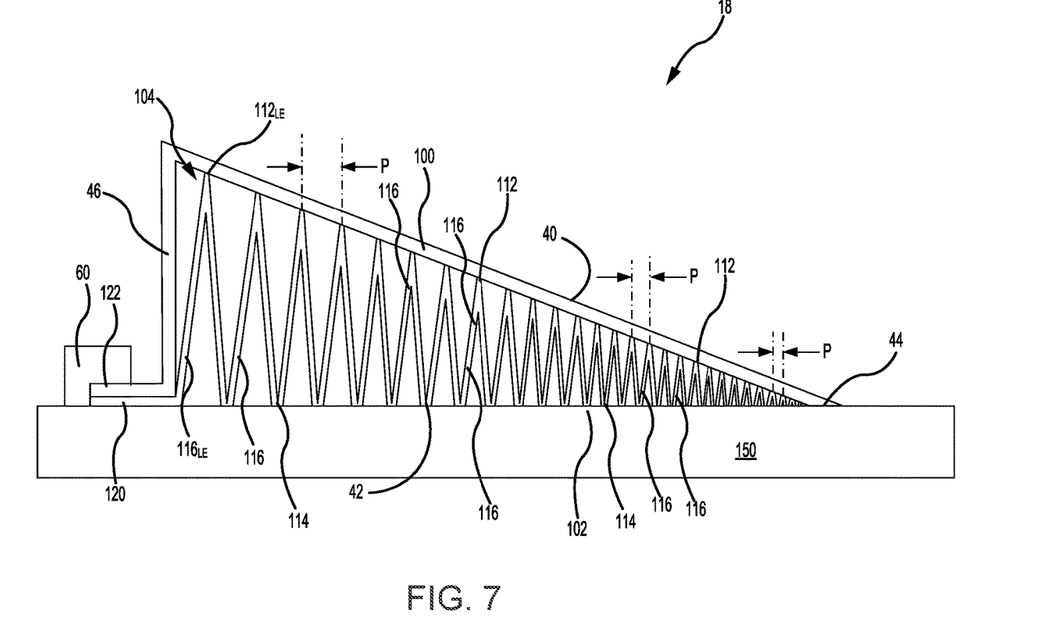
FIG. 7 illustrates a spoiler attached with an aerostructure with a corrugated core of the spoiler located adjacent the aerostructure surface, in accordance with various embodiments.

With reference to FIG. 7, in various embodiments, core 104 may form the lower surface 42 of spoiler 18. In other words, in various embodiments, spoiler 18 may not include inner skin 102. Lower surface 42 of spoiler 18 is a non-aerodynamic surface, which allows inner skin 102 to be eliminated. Stated differently, in various embodiments, grooves 114 may be located immediately adjacent an aerostructure 150. In various embodiments, aerostructure 150 comprises a portion of wing 12, with momentary reference to FIG. 1B.

Figure 8A:
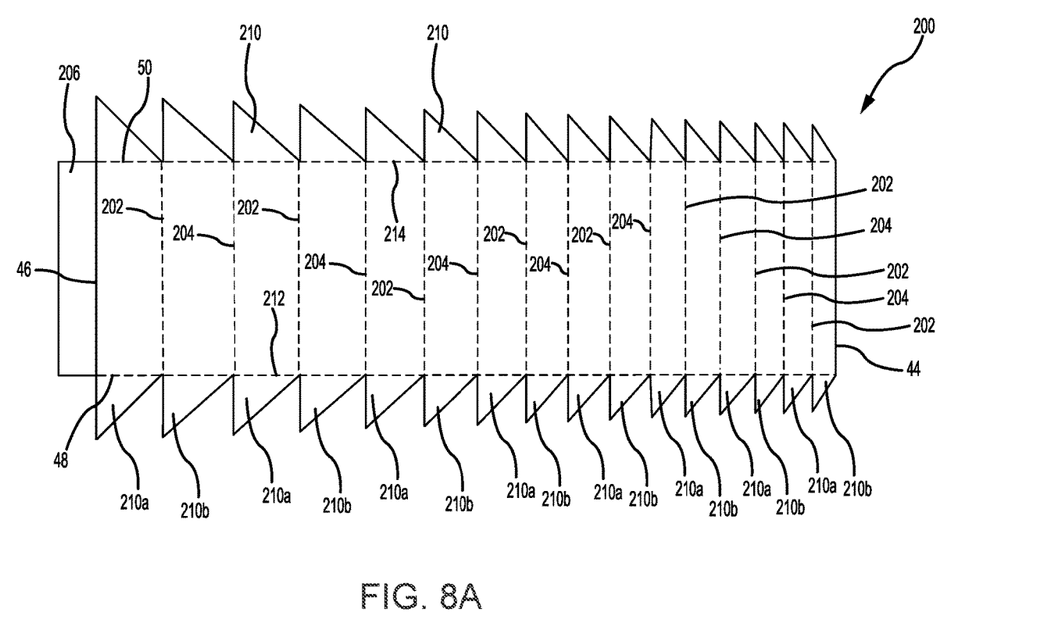
FIGS. 8A and 8B illustrate a panel for forming a corrugated core prior to forming the core and after forming the core from the panel, respectively, in accordance with various embodiments.
Figure 8B:
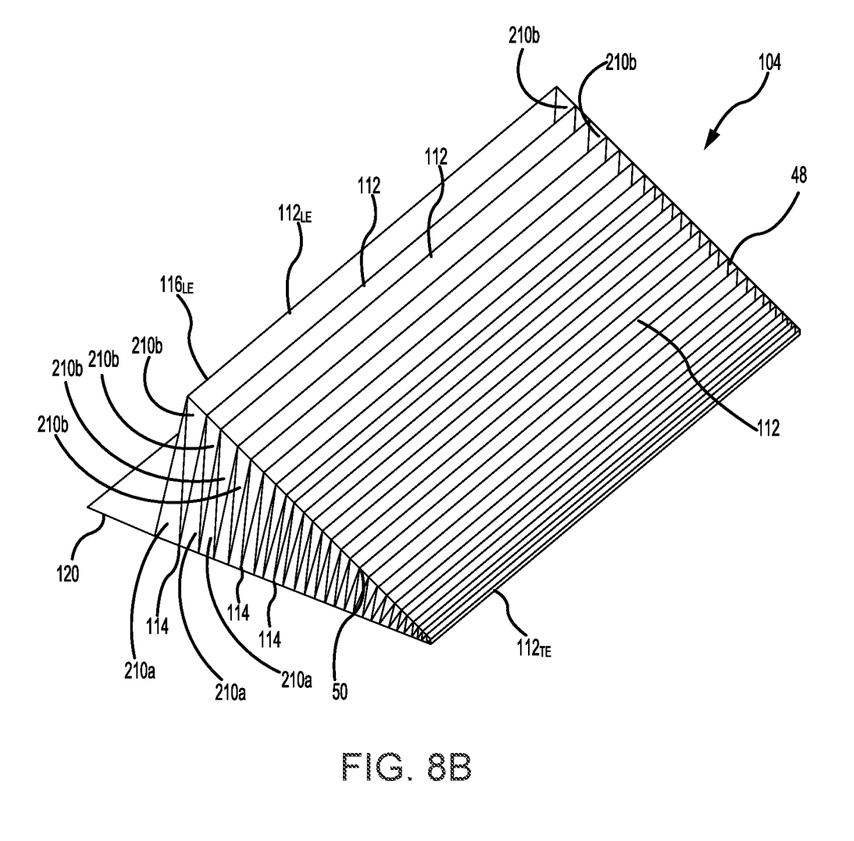

With reference to FIGS. 8A and 8B, a panel 200 for forming core 104 is illustrated. FIG. 8A illustrates panel 200 prior to forming/shaping core 104. FIG. 8B illustrates panel 200 after forming/shaping core 104. In accordance with various embodiments, panel 200 may be folded, bent, or otherwise shaped along dotted lines 202 to form ridges 112 and along dotted lines 204 to form grooves 114. In various embodiments, panel 200 includes mounting flange portion 206. Panel 200 may be folded, bent, or otherwise shaped, along leading edge 46 such that mounting flange portion 206 forms core mounting flange 120.

In various embodiments, panel 200 may include closeout flanges 210. Closeout flanges 210 are located at the inboard end 48 and the outboard end 50 of core 104. Closeout flanges 210 are configured to be formed (e.g., folded) along dotted lines 212 at inboard end 48 and along dotted lines 214 at outboard end 50. Once formed/folded, closeout flanges 210 cover the space between adjacent walls 116. For example, closeout flanges 210 are interleaved such that a group of first closeout flanges 210a are folded, and/or formed extending, in a first direction relative to dotted line 212 and a group of second closeout flanges 210b are folded, and/or formed extending, in a second direction relative to dotted line 212, with the second direction being opposite the first direction. The closeout flanges 210 at outboard end 50 are folded/formed in a similar manner along dotted line 214. Each of the first closeout flanges 210a covers an area defined by two adjacent grooves 114 and the ridge 112 located between the two adjacent grooves 114. Each of the second closeout flanges 210b covers an area defined by two adjacent ridges 112 and the groove 114 located therebetween. In this regard, the closeout flanges 210 may form outboard and inboard surfaces extending between outer skin 100 and inner skin 102, with momentary reference to FIG. 2A, and between leading edge 46 and trailing edge 44.

Figure 9:
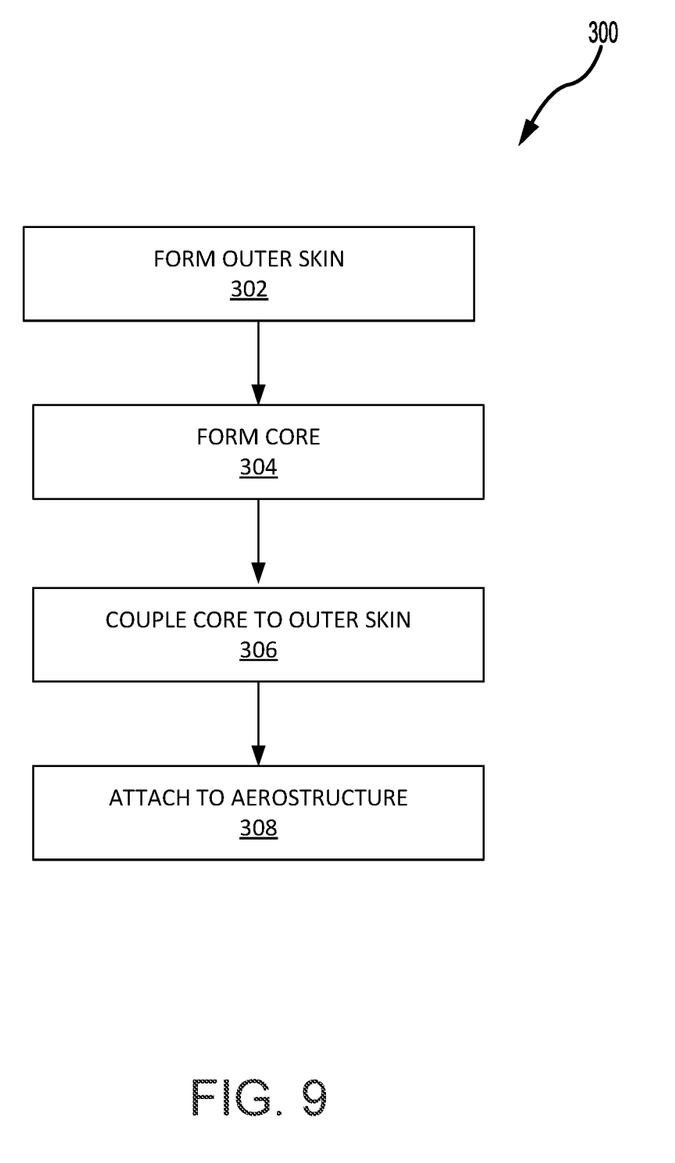
FIG. 9 illustrates a method for forming a control surface having a corrugated core, in accordance with various embodiments.

With reference to FIG. 9, a method 300 of forming a control surface is illustrated. Method 300 may include forming an outer skin (step 302), forming a thermoplastic panel into a corrugated core having a plurality of ridges and a plurality of grooves (step 304), and coupling the corrugated core to the outer skin (step 306). In various embodiments, step 304 includes forming the thermoplastic panel such that plurality of ridges decrease in height between a leading edge ridge of the plurality of ridges and a trailing edge ridge of plurality of ridges.

In various embodiments, step 306 comprises heating at least one of the outer skin or the corrugated core such that a matrix material of the fiber reinforced thermoplastic composite material of the corrugated core crosslinks with a matrix material of the fiber reinforced thermoplastic composite material of the outer skin. In various embodiments, method 300 may further comprise coupling the outer skin and the corrugated core to an aerostructure (step 308).

In various embodiments, method 300 may further include forming an inner skin comprising fiber reinforced thermoplastic composite material, locating the corrugated core between the inner skin and the outer skin, and coupling the corrugated core to the inner skin by heating at least one of the inner skin or the corrugated core such that the matrix material of the fiber reinforced thermoplastic composite material of the corrugated core crosslinks with a matrix material of the fiber reinforced thermoplastic composite material of the inner skin.

In various embodiments, step 304 may include heating the thermoplastic panel to a temperature sufficient to cause the thermoplastic material to become pliable. In various embodiments, step 304 may include forming a mounting flange at a leading edge of the corrugated core. In various embodiments, step 304 may include forming a plurality of closeout flanges extending between adjacent walls at an outboard end and an inboard end of the corrugated core. In various embodiments, step 304 may include forming the plurality of ridges having a decreased pitch proximate a trailing edge.

Forming a control surface, such as spoiler 18 employing method 300 and with a corrugated core 104 tends to decrease manufacturing time and costs relative to control surfaces having machined metal cores. Further, using a fiber reinforced thermoplastic composite material for the core and the skins tends to reduce a weight of the control surface and/or allows for a greater density of core material to employed between the skins without increasing the weight of the control surface as compared to metal cores. Finally, employing core (e.g., closeout flanges 210) to cover the inboard and outboard ends, eliminating the need to attach separate closeout structures, which can further reduce the manufacturing time and weight of the control surface.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A control surface for an aircraft, comprising:
   an outer skin; and
   a core coupled to the outer skin, the core including a plurality of folded corrugations, wherein a height of the core decreases in a direction extending from a leading edge of the control surface to a trailing edge of the control surface, wherein the plurality of folded corrugations extend from an interior wall immediately adjacent the leading edge to a point where the outer skin and an inner skin comes into contact at the trailing edge, wherein the plurality of folded corrugations comprise a plurality of ridges and a plurality of grooves, the plurality of ridges being located at the outer skin and the plurality of grooves being located at the inner skin, and wherein a pitch of the ridges proximate the trailing edge is less than a pitch of the ridges proximate the leading edge, the pitch of the ridges being the distance between adjacent ridges.

2. The control surface of claim 1, wherein the core further includes a core mounting flange at the leading edge of the control surface.

3. The control surface of claim 2, wherein the outer skin comprises an outer skin mounting flange, and wherein the outer skin mounting flange is coupled to the core mounting flange.

4. The control surface of claim 1, wherein the inner skin is coupled to the plurality of grooves.

5. The control surface of claim 4, wherein the core includes a plurality of closeout flanges located at an inboard end and an outboard end of the core extending between the plurality of ridges and the plurality of grooves and between the inner skin and the outer skin.

6. The control surface of claim 1, wherein the outer skin and the core each comprises a fiber reinforced thermoplastic composite material.

7. A method of forming a control surface, comprising:
   forming an outer skin;
   forming a thermoplastic panel into a corrugated core having a plurality of ridges and a plurality of grooves, wherein the corrugated core extends from an interior wall immediately adjacent a leading edge of the control surface to a point where the outer skin and an inner skin comes into contact at a trailing edge of the control surface, wherein the plurality of ridges decreases in height between a leading edge ridge of the plurality of ridges and a trailing edge ridge of the plurality of ridges, wherein the plurality of ridges are located at the outer skin and the plurality of grooves are located at the inner skin, and wherein a pitch of the ridges proximate the trailing edge is less than a pitch of the ridges proximate the leading edge, the pitch of the ridges being the distance between adjacent ridges; and
   coupling the corrugated core to the outer skin.

8. The method of claim 7, wherein the thermoplastic panel and the outer skin each comprises a fiber reinforced thermoplastic composite material.

9. The method of claim 8, wherein coupling the corrugated core to the outer skin comprises heating at least one of the outer skin or the corrugated core such that a matrix material of the fiber reinforced thermoplastic composite material of the corrugated core crosslinks with a matrix material of the fiber reinforced thermoplastic composite material of the outer skin.

10. The method of claim 9, further comprising:
    forming the inner skin comprising the fiber reinforced thermoplastic composite material;
    locating the corrugated core between the inner skin and the outer skin; and
    coupling the corrugated core to the inner skin by heating at least one of the inner skin or the corrugated core such that the matrix material of the fiber reinforced thermoplastic composite material of the corrugated core crosslinks with a matrix material of the fiber reinforced thermoplastic composite material of the inner skin.

11. The method of claim 7, wherein forming the thermoplastic panel into the corrugated core comprises forming a mounting flange at a leading edge of the corrugated core.

12. The method of claim 7, wherein forming the thermoplastic panel into the corrugated core comprises:
    forming a plurality of first closeout flanges over an outboard end of the control surface; and
    forming a plurality of second closeout flanges over an inboard end of the control surface.

13. The method of claim 12, further comprising coupling the outer skin and the corrugated core to an aerostructure, wherein the corrugated core is adjacent to the aerostructure.

14. The method of claim 7, wherein forming the thermoplastic panel into the corrugated core comprises forming the plurality of ridges having a decreased pitch proximate a trailing edge of the corrugated core.

15. An aerostructure, comprising:
    an aerostructure surface; and
    a control surface mounted to the aerostructure surface, the control surface including:
       an outer skin; and
       a core coupled to the outer skin, the core being located between the aerostructure surface and the outer skin, wherein the core includes a plurality of folded corrugations, wherein a height of the core decreases in a direction extending from a leading edge of the control surface to a trailing edge of the control surface, wherein the plurality of folded corrugations extend from an interior wall immediately adjacent the leading edge to a point where the outer skin and an inner skin comes into contact at the trailing edge, wherein the plurality of folded corrugations comprise a plurality of ridges and a plurality of grooves, the plurality of ridges being located at the outer skin and the plurality of grooves being located at the inner skin and wherein a pitch of the ridges proximate the trailing edge is less than a pitch of the ridges proximate the leading edge, the pitch of the ridges being the distance between adjacent ridges.

16. The aerostructure of claim 15, wherein the outer skin terminates at a leading edge ridge of the plurality of ridges.

17. The aerostructure of claim 15, wherein the core includes a core mounting flange and the outer skin includes an outer skin mounting flange, the outer skin mounting flange being coupled to the core mounting flange, and wherein the aerostructure further comprises a mount coupled to the outer skin mounting flange and the core mounting flange.

18. The aerostructure of claim 15, wherein the core is adjacent to the aerostructure surface.

\* \* \* \* \*